United States Patent [19]

Muse

[11] 4,011,178

[45] Mar. 8, 1977

[54] RESINS AND POLYMER MIXTURES THEREOF

[75] Inventor: Joel Muse, Medina, Ohio

[73] Assignee: The Goodyear Tire & Rubber Company, Akron, Ohio

[22] Filed: May 21, 1976

[21] Appl. No.: 688,812

Related U.S. Application Data

[63] Continuation of Ser. No. 535,609, Dec. 23, 1974, abandoned.

[52] U.S. Cl. .................. 260/4 AR; 260/32.8 A; 260/33.2 R; 260/33.6 UA; 260/33.6 PQ; 260/880 B; 260/881; 260/888; 526/185; 526/237; 526/347

[51] Int. Cl.² ................. C08K 5/01; C08K 5/06; C08K 5/07; C08L 7/00

[58] Field of Search ...... 260/4 AR, 32.8 A, 33.2 R, 260/33.6 UA, 33.6 PQ, 880 B, 881, 888; 526/185, 237, 347

[56] References Cited

UNITED STATES PATENTS 3,351,620  11/1967  Yamada et al. .................. 526/347

3,681,190  8/1972  Dahlquist ....................... 260/4 AR

OTHER PUBLICATIONS

Davis et al.—Chemistry & Technology of Rubber (Reinhold) (N.Y.) (1937), p. 671.
Morton—Rubber Technology (2nd Ed.) (Van Nostrand) (N.Y.), (7/12/73), p. 165.

*Primary Examiner*—Donald E. Czaja
*Assistant Examiner*—H. H. Fletcher
*Attorney, Agent, or Firm*—F. W. Brunner; H. C. Young, Jr.

[57] ABSTRACT

Synthetic resin composition and mixtures thereof in rubber-based compositions and paint-type resin compositions. Said synthetic resin composition is prepared by polymerizing monomer mixture of (A) selected methyl branched α-olefin having its tertiary carbon atom removed from the carbon-to-carbon double bond and (B) at least one aromatic monomer selected from styrene and α-methyl styrene.

13 Claims, No Drawings

RESINS AND POLYMER MIXTURES THEREOF

This is a continuation of application Ser. No. 535,609 filed Dec. 23, 1974.

This invention relates to synthetic resins and to a method of preparing such resins. The invention particularly relates to resinous compositions prepared from selected methyl branched α-olefins, styrene and α-methyl styrene. The invention further relates to rubber-based adhesives and to paint-type resin composites prepared with such synthetic resins.

Various methyl branched olefins can be polymerized with aluminum chloride to yield useful resinous tackifiers for natural and synthetic rubbers. However, in general, such resins are noticeably better tackifiers for some rubbers and relatively poor tackifiers for others, unless a very substantial amount of the resin is mixed with the rubber. Indeed, the degree of solubility of a synthetic resin in the desired rubber appears to play a major role in determining whether it is an effective tackifier.

It is, therefore, an object of this invention to provide a thermoplastic resin having an enhanced balance of tack imparting and solubility for selected synthetic rubbers and useful as a solubilizing aid for selected paint-type resins.

In accordance with this invention, it has been discovered that a resinous composition is prepared by polymerizing a monomer mixture comprising about 10 to about 90, preferably about 10 to about 80, weight percent of at least one methyl branched α-olefin having its tertiary carbon atom removed from the carbon-to-carbon double bond selected from at least one of 3-methyl-1-butene, 3-methyl-1-pentene, 4-methyl-1-pentene and, correspondingly, about 90 to about 10, preferably about 90 to about 20, weight percent aromatic monomers selected from at least one of styrene and α-methyl styrene in the presence of a catalyst selected from aluminum chloride, ethyl aluminum dichloride, boron trifluoride and boron trifluoride etherate, and in the presence of a solvent selected from said aliphatic hydrocarbons containing 4 to 7 carbon atoms, aromatic hydrocarbons containing 6 to 8 carbon atoms and liquid chloro-substituted hydrocarbons containing 1 to 6, preferably 1 to 2, carbon atoms.

In the practice of this invention, particularly useful resinous compositions, generally suitable as rubber tackifiers are prepared by polymerizing a monomer mixture comprising about 20 to about 80 weight percent of at least one of said methyl branched α-olefins, and, correspondingly, about 80 to about 20 weight percent of said aromatic monomers, said aromatic monomers comprising about 80 to about 100, preferably about 90 to about 100, weight percent styrene and, correspondingly, about 20 to about 0, preferably about 10 to about 0, weight percent α-methyl styrene.

In the further practice of this invention, particularly useful resinous compositions, generally suitable as a solubilizing and/or plasticizing aid for paint-type resins is prepared by polymerizing about 10 to about 50 weight percent of at least one of said methyl branched α-olefins, and, correspondingly, about 90 to about 50 weight percent of at least one of said aromatic monomers, where said aromatic monomers comprise about 0 to about 50, preferably about 0 to about 20, weight percent styrene and, correspondingly, about 100 to about 50, preferably about 100 to about 80, weight percent α-methyl styrene.

For the preparation of the resin compositions of this invention, 3-methyl-1-butene is the preferred methyl branched α-olefin.

Various hydrocarbon solvents can be used. Representative of various saturated aliphatic hydrocarbons are butane, pentane, hexane and heptane. Representative of various aromatic hydrocarbons are benzene, toluene, xylene and tetralin. Representative of various chloro-substituted hydrocarbon solvents are dichloroethylene, trichloroethylene, 1,1,2,2-tetrachloroethylene, methyl chloroform, dichloromethane, 1,2-dichloroethane, trichloroethane, 1,1,2,2-tetrachloroethane and chlorobenzene. Generally, saturated aliphatic hydrocarbons are preferred, particularly hexane and heptane.

For the preparation of the resin compositions of this invention, aluminum chloride and ethyl aluminum dichloride are preferred catalysts.

In the further practice of this invention, the olefin portion of the resin can be somewhat modified, so long as the basic selected methyl branched α-olefin/selected aromatic backbone is maintained. Such modification can be the addition of minor amounts of further selected methyl branched olefins. Thus the olefin portion of the monomer mixture, or resin composition, can be modified by containing 0 up to about 20 weight percent olefins selected from 2-methyl-1-butene, 2-methyl-2-butene, 2-methyl-1-pentene, and 2-methyl-2-pentene.

The resin compositions of this invention have a wide range of softening points, according to ASTM Method E28–58T, such as less than about 20° C, or a liquid at room temperature such as about 25° C, up to about 105° C, primarily because of the large impact of the difference in structure provided by the range of methyl branched olefin and aromatic monomer mixtures.

It was an important discovery that resin compositions of this invention can be useful as tack-imparting resins, particularly for rubber-based adhesives, including pressure sensitive adhesives.

Therefore in further accordance with this invention, a rubber-based composition is provided which comprises in the range of 30 to about 200 parts by weight of said resinous composition of this invention and about 100 parts by weight of a rubber selected from natural cis 1,4-polyisoprene rubber and synthetic rubber selected from cis 1,4-polyisoprene, polybutadiene, and copolymers and block copolymers of isoprene or 1,3-butadiene with styrene or acrylonitrile. Particularly advantageous compositions are comprised of the resin of this invention and a rubber selected from natural rubber, copolymers and block copolymers of 1,3-butadiene and styrene containing about 60 to about 95 units derived from styrene and polymers and copolymers of 1,3-butadiene and acrylonitrile.

The tackified rubber composition can typically be adaptable for use as a pressure sensitive adhesive, particularly when the rubber is selected from natural rubber and unvulcanized block copolymers of 1,3-butadiene or isoprene with styrene or acrylonitrile. Particularly useful are natural rubber and unvulcanized block copolymers of styrene-isoprene-styrene and styrene-butadiene-styrene.

Surprisingly, resin compositions of this invention can be provided which are valuable as solubilizing aids, agents or additives for selected paint-type resins which require highly aromatic solvent.

Therefore, in further accordance with this invention a fluid mixture is provided which comprises about 30 to about 70 parts by weight of a resin of this invention, 100 parts by weight of a normally solid, thermoplastic resin characterized by requiring, at about 25° C, a hydrocarbon solvent having a KB in the range of about 50 to about 110 to form a solution thereof, and sufficient solvent having a KB in the range of about 30 to about 40 to provide a concentration of said resins in the range of about 30 to about 60, preferably about 35 to about 45 weight percent based on said resin-solvent mixture.

The invention includes a coating prepared by applying a mixture comprised of said fluid mixture to a substrate and drying said applied mixture.

In the practice of this invention, the optimum amount of resin, amount of solvent and KB of the solvent is to be determined for individual application, depending somewhat on the resins and solvents used as well as the desired application. It is to be understood that various typical paint additives can be added to the fluid mixture, or solution, such as various pigments, thickeners, leveling agents and plasticizers.

Representative of well known paint-type resins are copolymers of a first monomer selected from at least one of styrene and vinyl toluene with at least one second monomer selected from 2-ethylhexyl acrylate, ethyl acrylate, butyl acrylate, butyl methacrylate and 1,3-butadiene; as well as chlorinated natural rubber. Preferred are styrene/2-ethylhexyl acrylate, vinyl toluene/2-ethylhexyl acrylate, styrene/1,3-butadiene and chlorinated natural rubber.

The KB value (Kauri-Butanol) of a hydrocarbon solvent is a measure of its aromatic content. Thus, a mineral spirits solvent can have a KB value of about 28 to about 70, where a KB value of about 26 represents a negligible aromatic content. For further example, toluene has a KB value of about 102. The important part of this invention resides in that generally a hydrocarbon solvent having a KB value at least about 50 is added to the various of such paint-type resins in order to provide a satisfactory fluid coating mixture or solution. However, when the resin of this invention is added to the paint-type resins, it may then be satisfactory to use a hydrocarbon solvent having a substantially lower KB value in the range of about 30 to about 40. Of course, solvents of higher KB values can still be used, if desired. Thus, a solvent having a substantially lower aromatic content may be used. Lower aromaticity is particularly of interest where such aromaticity is a potential toxic hazard. For the purpose of determining the KB of a hydrocarbon solvent, ASTM Method D-1133 is satisfactory.

In the practice, various hydrocarbon solvents can be used. Generally a mineral spirits mixture is used, comprised of liquid aliphatic and aromatic hydrocarbons, having a KB in the range of about 28 to about 40 to which is added, if desired, an aromatic hydrocarbon such as toluene, xylene, ethylbenzene, liquid ketones and ethylene glycol ethers to achieve the desired KB value.

The preparation of the resin of this invention can conveniently be carried out in the presence of a solvent or diluent because it is exothermic in nature. The diluent can be added solvents or unreacted hydrocarbons in the polymerization mixture. The polymerization can generally be carried out at a temperature in the range of about 0° to about 80° C, and more preferably in the range of about 15° to about 40° C. A temperature of about 20° to about 30° C is particularly useful, accompanied by the slow addition of the volatile reactants. Thus it is particularly preferred that the monomers be added to the reaction somewhat simultaneously and slowly enough that only a negligible amount of monomer is allowed to accumulate in the reaction mixture. The polymerization pressure can be atmospheric or above or below atmospheric pressure. However, if the higher range of reaction temperatures are desired, the polymerization may optionally be conducted under a pressure greater than atmospheric and/or a reduced rate of addition might also be provided. The time of polymerization reaction can vary considerably, such as from a few minutes to 1 or 2 hours or more. The resin can then be conveniently recovered by steam stripping to remove volatiles after deactivating the catalyst with lime, for example, and filtering, if desired, to remove deactivated catalyst residues.

If a boron trifluoride etherate complex is to be used as a catalyst for preparation of the resin composition, complexes of the type derived from boron trifluoride and an ether having from 2 to about 12, and preferably from 2 to about 6, carbon atoms are contemplated. The complex is generally represented by the formula:

$BF_3 \cdot OR_2$

Representative of various ethers for preparation of the etherate are those having the structure ROR', where R and R' are individually selected from saturated alkyl radicals having from 1 to about 6, and preferably from 1 to about 3, carbon atoms, such as methyl, ethyl, n-propyl, isopropyl, n-butyl, isobutyl, sec-butyl, t-butyl, n-pentyl, isopentyl, t-pentyl, isohexyl, n-hexyl and t-hexyl radicals. The ethyl radical is usually preferred. The complex, when not available commercially, can generally be prepared by reacting boron trifluoride gas with an ether in about equimolar quantities in an inert atmosphere at a temperature in the range of about −25° to about 25° C, and usually in the range of about 10° to about 25° C. Representative of various ethers are dimethyl ether, diethyl ether, methyl ethyl ether, di-n-propyl ether, diisopropyl ether, di-n-butyl ether, diisobutyl ether, di-t-butyl ether, di-n-amyl ether, diisoamyl ether, di-t-amyl ether, ethyl amyl ether, diisohexyl ether, di-n-hexyl ether, di-t-hexyl ether and butyl (2-ethyl hexyl) ether. Diethyl ether is usually preferred.

The following examples further illustrate the invention and are not intended to be limiting. In these examples, parts and percentages are by weight unless otherwise indicated.

EXAMPLE I

Various resin compositions were prepared and identified herein as Experiments A-O. For the preparation of these resin compositions, desired amounts of 3-methyl-1-butene along with styrene and/or α-methyl styrene were charged to a small storage container and pressured to about 75 psi (pounds per square inch gauge). To suitable reactor was charged 150 grams n-heptane and 2 grams catalyst which was aluminum chloride, unless otherwise noted. While stirring the heptane slurry or solution, the monomer mixture was slowly charged to the reactor from the storage container over a period of about 1.5 hours. The mixture was stirred for an additional hour. The reaction temperature was maintained throughout at about 24° to about 26° C. The catalyst was then deactivated and decomposed with the addition of 10 grams methanol to the mixture following which the resin solution was filtered through a mixture of asbestos and chemically inert silica. The resin product was isolated by steam stripping the filtrate to remove solvent and volatiles at a temperature of about 235° C. Two parts steam per 1 part resin was used. Several of the prepared resins were mixed with pale crepe natural rubber and tested for tack and shear values for use as a pressure sensitive adhesive composition. A mixture of 100 parts resin, 100 parts rubber and 600 parts toluene was prepared, cast, dried as a film and compared to a control using a resin having a softening point of about 92°–96° C derived by polymerizing a monomer mixture with aluminum chloride comprised primarily of a mixture of piperylene and 2-methyl-2-butene in about a 1.2/1 mole ratio, except for Experiments E-I & O. In Experiment O, a block copolymer of styrene-isoprene-styrene was used for the rubber. In E-I the control resin had a softening point of about 112° C, and had a minor amount of dicyclopentadiene added to its piperylene and 2-methyl-2-butene monomers used in its preparation. The Experiment parameters and results are in Table 1.

TABLE 2

| Exp | Resin from Exp | styrene/ acrylate resin | vinyl toluene/ acrylate resin | KB of solvent | Solution[1,2] Appearance |
|---|---|---|---|---|---|
| P | F | 23 | — | 28 | I |
| Q | F | 23 | — | 35 | CL |
| R | H | 23 | — | 28 | I |
| S | H | 23 | — | 35 | CL |
| T | I | 23 | — | 28 | I |
| U | I | 23 | — | 35 | CL |
| V | N | — | 23 | 28 | CL |
| W | N | — | 23 | 35 | CL |

[1]CL indicates a cloudy solution
[2]I indicates that the resin was insoluble in the KB-28 hydrocarbon solvent The tack and shear values are obtainable according to Methods PSTC-6 and PSTC-7 of the Pressure Sensitive Tape Council. These methods can be found in the publication "Test Methods for Pressure Sensitive Tapes" developed by the Pressure Sensitive Tape Council, 1201 Waukegan Road, Glenview, Ill. For example, the tack can be measured by rolling a ball down an incline and onto a horizontally positioned sample. The distance in inches is measured which the ball travelled across the sample. Thus, the larger the value for

TABLE 1

| Exp. | gms 3MB1 | gms Styrene | gms alpha methyl styrene | mole ratio 3MB1/aromatic monomer | $M_n$[1] | S.P.[2] °C | Yield % | Tack[3] In | Shear[4] % |
|---|---|---|---|---|---|---|---|---|---|
| A | 99 | 150 | — | 1/1 | 1270 | — | 79 | 0.74 | 110 |
| B | 152 | 116 | — | 2/1 | 890 | — | 76 | 0.85 | 182 |
| C | 150 | 74 | — | 3/1 | 880 | — | 75 | 0.60 | 40 |
| D | 149 | 52 | — | 4/1 | 990 | — | 83 | 0.48 | 33 |
| E[5] | 94 | 140 | — | 1/1 | 590 | — | 48 | 1.23 | 80 |
| F[5] | 44 | 199 | — | 1/3 | 1520 | 103 | 61 | 13 | didn't move in 8 days |
| G | 69 | 197 | — | 1/2 | 750 | 64 | 81 | 1.70 | 290 |
| H | 46 | 208 | — | 1/3 | 1120 | 85 | 85 | 4.79 | 1614–1926 |
| I | 37 | 221 | — | 1/4 | 980 | 82 | 82 | 10.0 | 2234 |
| J | 93 | — | 160 | 1/1 | 423 | — | 70 | — | — |
| K | 127 | — | 112 | 2/1 | 630 | — | 70 | — | — |
| L | 153 | — | 88 | 3/1 | 688 | — | 75 | — | — |
| M | 161 | — | 72 | 4/1 | 760 | — | 74 | — | — |
| N | 36 | — | 231 | 1/4 | 390 | — | 70 | — | — |
| O | 69 | 197 | — | 1/2 | — | — | — | 2.7 | didn't move in 30 days |

[1]Number average molecular weight determined in benzene
[2]Ring and Ball softening point (ASTM E28-58T)
[3]The tack of the control was 0.48 inches for Experiments A-D, 3.5 inches for Experimes E-I and 1.4 inches for Experiment 0
[4]Shear as a percent of the shear of the control
[5]Catalyst was ethyl aluminum dichloride

EXAMPLE II

Mixtures and solutions were prepared by mixing 12 parts of various resins prepared from several of the Experiments in Example I with 23 parts paint-type granular thermoplastic resins selected from styrene/2-ethyl hexyl acrylate copolymers and vinyl toluene/2-ethylhexyl acrylate copolymers along with 65 or 71 parts of a hydrocarbon solvent having a KB value of about 28 or 35 comprised of 65 parts mineral spirits having a KB of 28 and, optionally, 6 parts toluene. The mixtures are identified herein as Experiments P-W and were prepared by simply mixing the materials with slow agitation at about 25° C for about 18–20 hours. The results are more clearly shown in the following Table 2.

the test, the smaller the amount of tack. The shear strength can be measured by applying a 500 gram weight to the sample and measuring the time in minutes required for the tape to separate from the substrate.

While certain representative embodiments and details have been shown for the purpose of illustrating the invention, it will be apparent to those having skill in this art that various changes and modifications may be made therein without departing from the spirit or scope of the invention.

What is claimed is:

1. A resinous composition, suitable as a solubilizing and/or plasticizing aid for paint-type resins, characterized by enabling a fluid coating mixture with a paint-type resin comprised of at least one of styrene/2-ethylhexyl acrylate, vinyl toluene/2-ethylhexyl acrylate, styrene/1,3-butadiene and chlorinated natural rubber with a solvent, or solvent mixture, having a KB value in the range of about 30 to about 40 selected from aromatic hydrocarbons, aliphatic hydrocarbons, liquid ketones, and ethylene glycol ethers prepared by the method which comprises (A) polymerizing a monomer mixture comprising about 10 to about 90 weight percent of at least one methyl branched α-olefin selected from 3-methyl-1-butene and 4-methyl-1-pentene and, correspondingly, about 90 to about 10 weight percent aromatic monomers selected from at least one of styrene and α-methyl styrene in the presence of a catalyst selected from aluminum chloride, ethyl aluminum dichloride, boron trifluoride and boron trifluoride etherate, and in the presence of a solvent selected from aliphatic hydrocarbons containing 4 to 7 carbon atoms, aromatic hydrocarbons containing 6 to 8 carbon atoms and liquid chloro-substituted hydrocarbons containing 1 to 6 carbon atoms and (B) removing said solvent therefrom.

2. The resin composition of claim 1, where said solvent is comprised of mineral spirits comprised of liquid aliphatic and aromatic hydrocarbons prepared by polymerizing a monomer mixture comprising about 20 to about 80 weight percent of 3-methyl-1-butene and, correspondingly, about 80 to about 20 weight percent of said aromatic monomers, said aromatic monomers comprising about 80 to about 100 weight percent styrene and, correspondingly, about 20 to about 0 weight percent α-methyl styrene.

3. The resin composition of claim 1 prepared by polymerizing a monomer mixture comprising about 20 to about 80 weight percent 3-methyl-1-butene and, correspondingly, about 80 to about 20 weight percent aromatic monomers comprised of about 90 to about 100 weight percent styrene and, correspondingly about 10 to about 0 weight percent α-methyl styrene in the presence of a catalyst selected from aluminum chloride and ethyl aluminum dichloride and in the presence of a solvent primarily selected from hexane, heptane, benzene, toluene and xylene.

4. The resin composition of claim 1 where said olefin portion of said monomer mixture is modified by containing in the range of about 0 up to about 20 weight percent olefins selected from 2-methyl-1-butene, 2-methyl-2-butene, 2-methyl-1-pentene, and 2-methyl-2-pentene based on said olefin portion.

5. The resin composition of claim 1 prepared by polymerizing about 10 to about 50 weight percent 3-methyl-1-butene and, correspondingly, about 90 to about 50 weight percent of at least one of said aromatic monomers, where said aromatic monomers comprise about 0 to about 20 weight percent styrene and, correspondingly, about 100 to about 80 weight percent α-methyl styrene in the presence of a catalyst selected from aluminum chloride and ethyl aluminum dichloride and in the presence of a solvent primarily selected from hexane, heptane, benzene, toluene and xylene.

6. The resin composition of claim 5 where said olefin portion of said monomer mixture is modified by containing in the range of about 0 up to about 20 weight percent olefins selected from 2-methyl-1-butene, 2-methyl-2-butene, 2-methyl-1-pentene and 2-methyl-2-pentene based on said olefin portion.

7. A rubber-based composition which comprises in the range of 30 to about 200 parts by weight of said resinous composition prepared according to claim 4 and about 100 parts by weight of a rubber selected from natural cis-1,4-polyisoprene rubber and synthetic rubber selected from cis-1,4-polyisoprene, polybutadiene and copolymers and block copolymers of dienes selected from isoprene and 1,3-butadiene with monomers selected from styrene and acrylonitrile.

8. The rubber-based composition of claim 7 where said rubber is selected from natural rubber, copolymers and block copolymers of 1,3-butadiene and styrene containing about 60 to about 95 weight percent units derived from styrene and polymers and copolymers of 1,3-butadiene and acrylonitrile.

9. A fluid mixture which comprises about 30 to about 70 parts by weight of the resin composition prepared according to claim 6, 100 parts by weight of a normally solid, thermoplastic resin characterized by requiring, at about 25° C, a hydrocarbon solvent having a KB in the range of about 50 to about 110 to form a solution thereof, and sufficient solvent having a KB in the range of about 30 to about 40 to provide a concentration of said resin composition and thermoplastic resin composition in the range of about 30 to about 60 weight percent based on said resin-solvent mixture.

10. A solution according to claim 9 where said thermoplastic resin is selected from copolymers of a first monomer selected from at least one of styrene and vinyl toluene with at least one second monomer selected from 2-ethylhexyl acrylate, ethyl acrylate, butyl acrylate, butyl methacrylate and 1,3-butadiene; as well as chlorinated natural rubber.

11. A solution according to claim 10 where said thermoplastic resin is a copolymer selected from styrene/2-ethylhexyl acrylate, vinyl toluene/2-ethylhexyl acrylate and styrene/1,3-butadiene copolymers.

12. A solution according to claim 10 where said solvent is selected from mineral spirits comprised of liquid aliphatic and aromatic hydrocarbons having a KB in the range of about 28 to about 40 to which is added, if desired, solvents selected from aromatic hydrocarbons selected from toluene, xylene and ethylbenzene, liquid ketones and ethylene glycol ethers to achieve the desired KB value.

13. A coating prepared by applying the fluid mixture of claim 9 to a substrate surface and drying said mixture.

* * * * *